(12) United States Patent
Karnik

(10) Patent No.: US 11,989,152 B1
(45) Date of Patent: May 21, 2024

(54) SELF-CONFIGURING UART INTERFACE AND METHOD OF OPERATION

(71) Applicant: Endress+Hauser SE+Co. KG, Maulburg (DE)

(72) Inventor: Gautham Karnik, Whitestown, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 12 days.

(21) Appl. No.: 18/154,203

(22) Filed: Jan. 13, 2023

(51) Int. Cl.
*G06F 13/42* (2006.01)

(52) U.S. Cl.
CPC ............................... *G06F 13/4282* (2013.01)

(58) Field of Classification Search
CPC .................................................. G06F 13/4282
See application file for complete search history.

(56) References Cited

U.S. PATENT DOCUMENTS

| | | | | |
|---|---|---|---|---|
| 2006/0245533 | A1* | 11/2006 | Rostampour | G06F 13/385 375/377 |
| 2007/0162666 | A1* | 7/2007 | Ise | G06F 13/4282 710/62 |
| 2010/0161860 | A1* | 6/2010 | Chien | G06F 13/385 710/106 |
| 2011/0060850 | A1* | 3/2011 | Ko | H04W 88/06 710/15 |
| 2014/0195707 | A1* | 7/2014 | Wang | G06F 13/4068 710/110 |
| 2016/0217052 | A1* | 7/2016 | Lin | G06F 11/221 |

\* cited by examiner

*Primary Examiner* — Henry Tsai
*Assistant Examiner* — Harry Z Wang
(74) *Attorney, Agent, or Firm* — Mark A. Logan; Endress+Hauser (USA) Holding, Inc.

(57) ABSTRACT

An interface circuit enabling serial data communication between a master UART and a slave UART includes two master terminals, two slave terminals, and various logic gates and switches. If data are sent by the master UART before the interface circuit is internally configured, data are sent to both slave terminals. Data received from the slave UART internally configures the interface circuit to route slave transmit data to the master receiver and to route master transmit data to the slave receiver. A master UART including such an interface circuit is also disclosed.

5 Claims, 4 Drawing Sheets

SELF-CONFIGURING UART INTERFACE AND METHOD OF OPERATION

TECHNICAL FIELD

The present disclosure relates generally to an interface circuit for interfacing a master universal asynchronous receiver transmitter (UART) with a slave UART. The interface circuit includes an automatic transmit and receive configuration to automatically correctly connect the transmit and receive lines of the two UARTs.

BACKGROUND

A UART is a rudimentary but widely used device for asynchronous serial communication. The serial communication is often between a master device (e.g., a main processing device) and a slave device (e.g., a peripheral device). To enable communication between the master and slave devices, the transmit line of each device must be connected with the receive line of each device. However, it may be the case that a cable connecting the master and slave devices does not cross the transmit and receive lines so that the transmit line of each device to the receive line of the other device. Or alternately, a user of the master and slave devices does not know which lines are transmit lines and which lines are receive lines and therefore does not know how, in what manner, a cable should connect the two devices.

SUMMARY

Accordingly, there remains a need for further contributions in this area of technology. According to at least one embodiment of the disclosure, a universal asynchronous receiver transmitter (UART) interface circuit, comprises a master transmit (TX) input, a master receive (RX) output, a first slave input/output (I/O), a second slave I/O, and an enable (EN) input; an inverter configured to logically invert a signal at the EN input; a first single-pole, double-throw (SPDT) switch having a normally closed (NC) terminal, a normally open (NO) terminal, a common (COM) terminal, and a control (CTRL) input, wherein the NC terminal is connected with the master TX input and the NO terminal is connected with the master RX output; a second SPDT switch having an NC terminal, an NO terminal, a COM terminal, and a CTRL input, wherein the NC terminal is connected with the master TX input and the NO terminal is connected with the master RX output; a third SPDT switch having an NC terminal, an NO terminal, a COM terminal, and a CTRL input, wherein the NC terminal is connected with the COM terminal of the first SPDT switch, the COM terminal is connected with the first slave terminal, and the NO terminal is left unconnected; a fourth SPDT switch having an NC terminal, an NO terminal, a COM terminal, and a CTRL input, wherein the NC terminal is connected with the COM terminal of the second SPDT switch, the COM terminal is connected with the second slave terminal, and the NO terminal is left unconnected; a first retriggerable monoshot having a Q output, an nQ output that is a logical inverse of the Q output, a clock (CLK) input, and a reset input, wherein the CLK input is connected with the first slave terminal, and wherein the Q output remains a logic 1 for a hold time after a triggering of the first retriggerable monoshot; a second retriggerable monoshot having a Q output, an nQ output, a CLK input, and a reset input, wherein the CLK input is connected with the second slave terminal, and wherein the Q output remains a logic 1 for the hold time after a triggering of the second retriggerable monoshot; a first AND gate configured to logically AND the Q output of the first retriggerable monoshot and the nQ output of the second retriggerable monoshot, wherein an output of the first AND gate drives the CTRL input of the first SPDT switch; a second AND gate configured to logically AND the Q output of the second retriggerable monoshot and the nQ output of the first retriggerable monoshot, wherein an output of the second AND gate drives the CTRL input of the second SPDT switch; a first OR gate configured to logically OR the inverted EN input and the Q output of the second retriggerable monoshot, wherein an output of the first OR gate drives the reset input of the first retriggerable monoshot; a second OR gate configured to logically OR the inverted EN input and the Q output of the first retriggerable monoshot, wherein an output of the second OR gate drives the reset input of the second retriggerable monoshot; a third AND gate configured to logically AND the nQ output of the first retriggerable monoshot, the nQ output of the second retriggerable monoshot, and the EN input, wherein an output of the third AND gate drives the CTRL input of the third SPDT switch; and a fourth AND gate configured to logically AND the nQ output of the first retriggerable monoshot, the nQ output of the second retriggerable monoshot, and the EN input, wherein an output of the fourth AND gate drives the CTRL input of the fourth SPDT switch.

According to another embodiment of the present disclosure, a master UART comprises a transmit data line configured to output digital data serially; a receive data line configured to receive digital data serially; and a UART interface circuit, wherein the transmit data line is connected with the master TX input of the UART interface circuit and the receive data line is connected with the master RX output of the UART interface circuit.

According to another embodiment of the present disclosure, a master communication interface comprises a master UART comprising a UART interface circuit, wherein the transmit data line of the master UART is connected with the master TX input of the UART interface circuit and the receive data line of the master UART is connected with the master RX output of the UART interface circuit. The master communication interface further comprises an enable signal that is a binary output signal, wherein the enable signal is connected with the EN input of the UART interface circuit. The master communication interface is configured to: send and receive binary serial data via the master UART, set the enable signal low and send binary serial during a first communication via the master UART, set the enable signal high after the first communication via the master UART, and set the enable signal low and send binary serial data during a subsequent communication via the master UART when the master UART has not received binary serial data for at least the hold time.

According to another embodiment of the present disclosure, a method of interfacing a master UART with a slave UART comprises: providing a UART interface circuit having a master transmit port, a master receive port, a first slave port, and a second slave port, wherein the UART interface circuit is internally configured such that the master transmit port is connected with both the first and second slave ports and such that the master receive port is not connected with either of the slave ports; connecting a master UART transmit data line with the master transmit port and a master UART receive data line with the master receive port; connecting a slave UART transmit data line with either of the two slave ports, and connecting a slave UART receive data line with the other slave port; transmitting binary data from the slave UART transmit data line to the UART interface circuit via the connected port; configuring the UART interface circuit to internally connect the master receive port with the slave port via which the slave UART transmitted the binary data; and configuring the UART interface circuit to internally connect the master transmit port with the slave port with which the slave UART receive data line is connected.

The disclosed method may further comprise: before the transmitting of the binary data from the slave UART transmit data line, configuring the UART interface circuit to internally connect the master transmit port with both of the slave ports; and transmitting binary data from the master UART transmit data line to both of the slave ports.

DETAILED DESCRIPTION

Disclosed herein is a self-configuring UART interface that may be used to interface two UARTs together for sending and receiving data between the two UARTs. Also disclosed is a master UART having a self-configuring UART interface circuit. Various embodiments of the disclosed devices will now be presented in conjunction with the figures that illustrate the embodiments. It will be understood that no limitation of the scope of this disclosure is thereby intended.

Figure 1A:
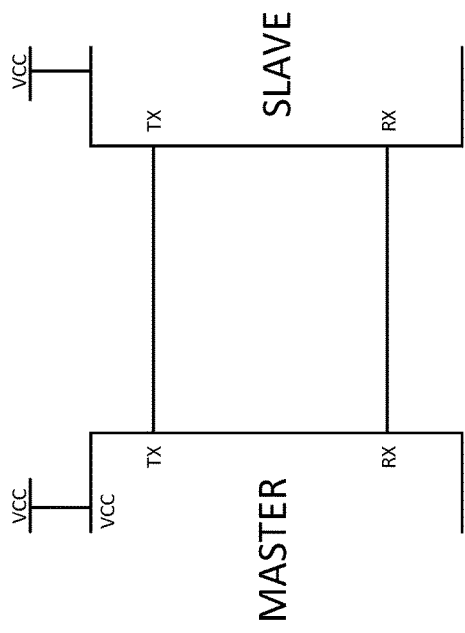
FIG. 1A shows a schematic of a master UART and a slave UART improperly connected.
Figure 1B:
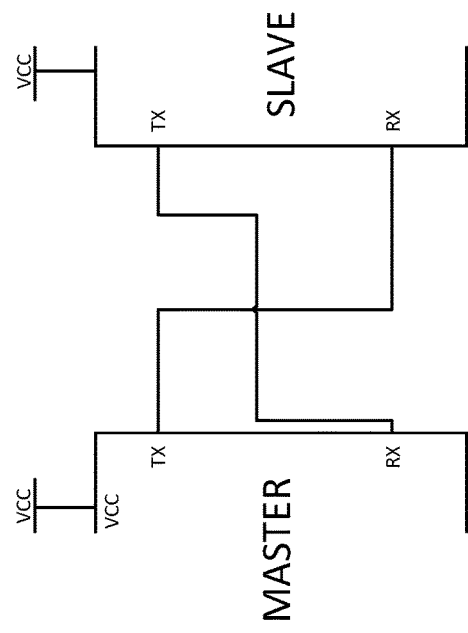
FIG. 1B shows a schematic of a master UART and a slave UART properly connected.
Figure 2:
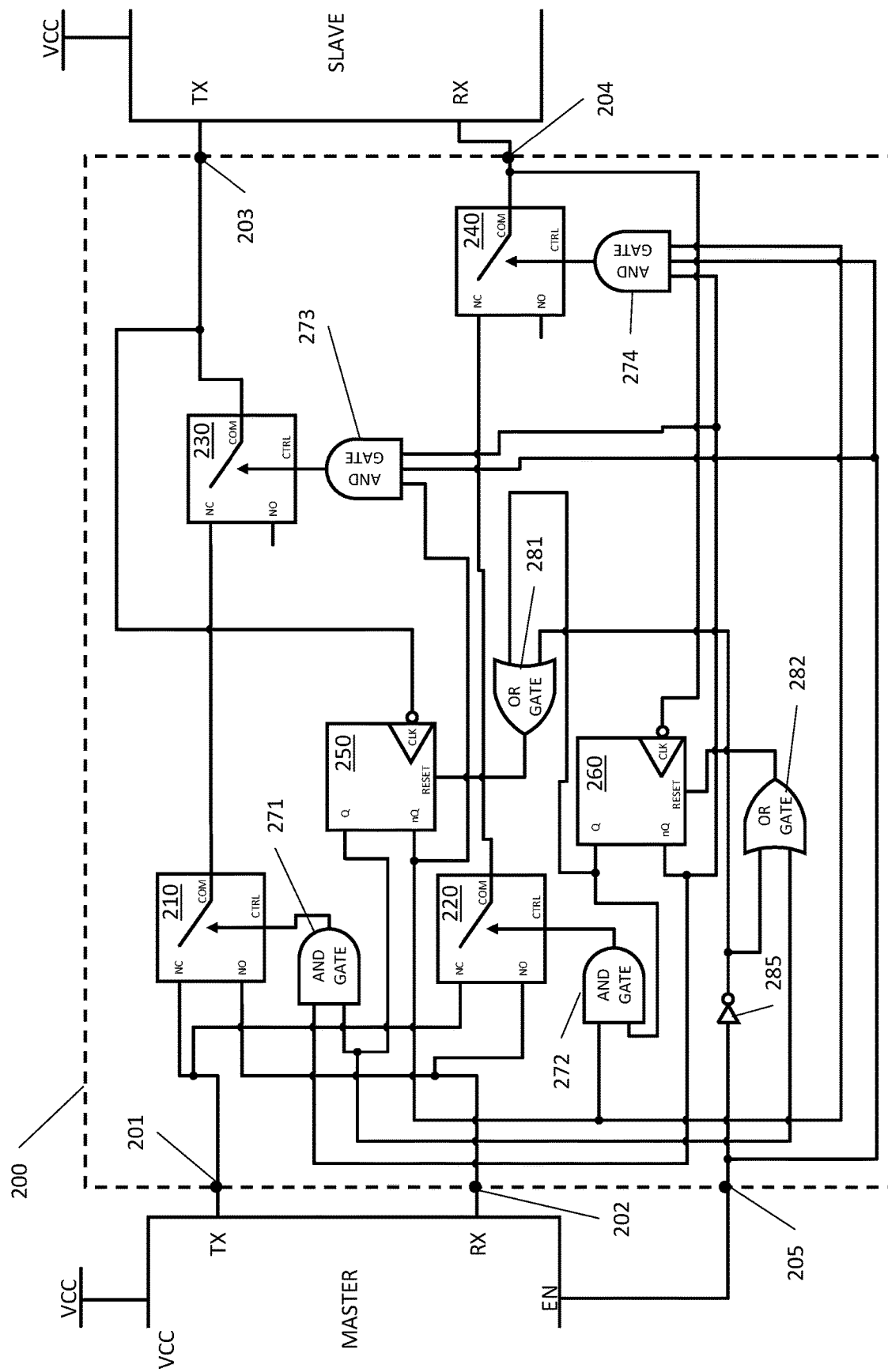
FIG. 2 shows schematically a self-configuring UART interface circuit according to an embodiment of the present disclosure.

FIG. 2 shows a self-configuring UART interface circuit 200 according to an embodiment of the present disclosure. The interface circuit 200 may include a master TX input 201 and a master RX output 202. The interface circuit may include a first slave terminal 203 and a second slave terminal 204. The interface circuit 200 may further include an enable input EN 205. The enable input EN 205 may be active high so that a high logic signal at the EN input 205 may enable the interface circuit 200 to operate, and a low logic signal at the EN input 205 may hold the interface circuit 200 in reset.

The interface circuit 200 may include an inverter 285 connected with the EN input 205. Both the EN input 205 and the logical inverse of the EN input 205 may be provided within the interface circuit 200.

When the interface circuit 200 is connected with a master UART, the master UART's transmit (TX) data line may be connected with the master TX input 201, and the master UART's receive (RX) data line may be connected with the master RX output 202. But when the interface circuit 200 is connected additionally with a slave UART, the slave UART's TX data line may be connected with either the first the slave terminal 203 or the second slave terminal 204. The slave UART's RX data line may be connected with other the slave terminal 203, 204 not connected with the slave UART's TX data line. The interface circuit 200 permits communication between a master UART and a slave UART no matter in which manner the slave UART's RX and TX lines are connected with the interface circuit 200.

The interface circuit 200 may include a first single-pole, double-throw (SPDT) switch 210 having a normally closed terminal NC, a normally open terminal NO, a common terminal COM, and an active high control input CTRL. In a default, power-up configuration of the SPDT switch 210, the NC and COM terminals are internally connected. However, an asserting of the CTRL input throws the SPDT switch 210 and thereby internally connects the NO and COM terminals and no longer the NC and COM terminals.

The interface circuit 200 may further include a second SPDT switch 220 that is embodied identically to the first SPDT switch 210. The second SPDT switch 220 may be configured and may operate in the same manner as the first SPDT switch 210.

The master TX input 201 of the interface circuit 200 may be connected with both the NC terminal of the first SPDT switch 210 and the NC terminal of the second SPDT switch 220. The master RX output of the interface circuit 200 may be connected with both the NO terminal of the first SPDT switch 210 and the NO terminal of the second SPDT switch 220.

The COM terminal of the first SPDT switch 210 may be connected with the NC terminal of a third SPDT switch 230 of the interface circuit 200. The COM terminal of the third SPDT switch 230 may be connected with the first slave terminal 203. The NO terminal of the third SPDT switch 230 may be left unconnected. The third SPDT switch 230 may be configured and may operate in the same manner as the first SPDT switch 210.

The COM terminal of the second SPDT switch 220 may be connected with the NC terminal of a fourth SPDT switch 240 of the interface circuit 200. The COM terminal of the fourth SPDT switch 240 may be connected with the second slave terminal 204. The NO terminal of the fourth SPDT switch 240 may be left unconnected. The fourth SPDT switch 240 may be configured and may operate in the same manner as the first SPDT switch 210.

By the default then, the TX input 201 of the interface circuit 200 is routed both to the first slave terminal 203 via the first SPDT switch 210 and the third SPDT switch 230 and to the second slave terminal 204 via the second SPDT switch 220 and the fourth SPDT switch 240. In this default configuration of the interface circuit 200, any communication received by the interface circuit 200 at its TX input 201 is sent to both slave terminals 203, 204.

Because the master RX output 202 of the interface circuit 200 is connected to the NO terminal of the first SPDT switch 210 and to the NO terminal of the second SPDT switch 220, and indeed these are the "normally open" terminals of the SPDT switches 210, 220, no signal may be sent to the master RX output 202 in the default, power-on state of the interface circuit 200. That is, in the default state of the interface circuit 200, the RX output 202 is simply an open circuit.

The interface circuit 200 may further include a first retriggerable monoshot 250, also known as a monostable multivibrator 250. The first retriggerable monoshot 250 may have a Q output, an nQ output that is the logical inverse of the Q output, an active high RESET input, and a CLK input. The CLK input of the first retriggerable monoshot 250 may be active on a falling edge of its input signal.

The first retriggerable monoshot 250 may operate as follows: When the signal to the RESET input is asserted, the Q output is 0 and the nQ output is 1. This state is maintained as long as the RESET signal is asserted. When the RESET signal is not asserted and the CLK input detects a falling edge of its input signal, the Q output becomes 1 and the nQ output becomes 0. The first retriggerable monoshot 250 may maintain Q=1 and nQ=0 for a pre-determined time period and may then revert to its untriggered state where Q=0 and nQ=1. The pre-determined time period for maintaining the state of Q=1 and nQ=0 is usually specified by a resistor-capacitor combination at an input of the integrated circuit of the first retriggerable monoshot 250.

The first retriggerable monoshot 250 may further operate as follows: If the CLK input of the first retriggerable monoshot 250 detects a falling edge of its input signal while Q=1 and nQ=0, the time period for holding this state is then reset and thus extended by the pre-determined time period. However, if no falling edge of the CLK input is detected and the first retriggerable monoshot 250 reverts to the state of Q=0 and nQ=1, the first retriggerable monoshot 250 may again be triggered by a falling edge at the CLK input so that again Q=1 and nQ=0 for the pre-determined time period.

The interface circuit 200 may further include a second retriggerable monoshot 260. The second retriggerable monoshot may be configured and may operate identically to the first retriggerable monoshot 250.

In the interface circuit 200, the first slave terminal 203 may be connected to the CLK input of the first retriggerable monoshot 250, and the second slave terminal 204 may be connected to the CLK input of the second retriggerable monoshot 260. Therefore, when the RESET signal is not asserted, a falling edge at the first slave terminal 203—for example, a start bit of a serial data transmission received from a slave UART connected thereto—may trigger the first retriggerable monoshot 250. In a like manner, a start bit at the second slave terminal 204 may trigger the second retriggerable monoshot 260.

The Q output of the first retriggerable monoshot 250 may be logically ANDed with the nQ output of the second retriggerable monoshot 260 via a first AND gate 271. In a like manner, the Q output of the second retriggerable monoshot 260 may be logically ANDed with the nQ output of the first retriggerable monoshot 250 via a second AND gate 272. The output of the first AND gate 271 may be fed to the CTRL input of the first SPDT switch 210, and the output of the second AND gate 272 may be fed to the CTRL input of the second SPDT switch 220. Therefore, in the default configuration of the interface circuit 200 when neither retriggerable monoshot 250, 260 has been triggered and therefor the Q output of each retriggerable monoshot 250, 260 is 0, the output of the first and second AND gates 271, 272 will be 0 and the first and second SPDT switches 210, 220 will remain in the default state of NC-COM.

The CTRL input of the third SPDT switch 230 may be controlled by a third AND gate 273, and the CTRL input of the fourth SPDT switch 240 may be controlled by a fourth AND gate 274. Each of the third and fourth AND gates 273, 274 may logically AND together three signals: the EN input of the interface circuit 200; the nQ output of the first retriggerable monoshot 250; and the nQ output of the second retriggerable monoshot 260.

When the EN input 205 is asserted high and neither the first retriggerable monoshot 250 nor the second retriggerable monoshot 260 has been triggered, all three inputs to the third and fourth AND gates 273, 274 will be a logic 1. The logic 1 output of the third AND gate 273 will throw the third SPDT switch 230 to the NO-COM sate, and the logic 1 output of the fourth AND gate 274 will throw the fourth SPDT switch 240 to the NO-COM state. Therefore, in this state the signal from the first slave terminal 203 will be connected only with the CLK input of the first triggerable monoshot 250 and will not be connected with either the master TX input 201 or the master RX output 202. Additionally, in this state the signal from the second slave terminal 204 will be connected only with the CLK input of the second triggerable monoshot 260 and will not be connected with either the master TX input 201 or the master RX output 202.

The interface circuit may further include a first OR gate 281 having its output connected with the RESET input of the first retriggerable monoshot 250. The first OR gate 281 may logically OR the Q output of the second retriggerable monoshot 260 with the inverted EN signal (from inverter 285). The interface circuit may further include a second OR gate 282 having its output connected with the RESET input of the second retriggerable monoshot 260. The second OR gate 282 may logically OR the Q output of the first retriggerable monoshot 250 with the inverted EN signal. Thus each retriggerable monoshot 250, 260 is controlled by an OR of the Q output of the other retriggerable monoshot 250, 260 with the inverted EN signal.

The RESET signal of the first retriggerable monoshot 250 is thus controlled as follows: when the EN input 205 signal is low (e.g., to disable the interface circuit 200), the inverted EN signal (from inverter 285) will force the output of the first OR gate 281 high and thus will hold the first retriggerable monoshot 250 in reset. When the EN input 205 signal is asserted high (e.g., to enable the interface circuit 200), the inverted EN signal (from inverter 285) will no longer force the output of the first OR gate 281 high. If the second retriggerable monoshot 260 has not yet been triggered and its Q output remains at 0, the output of the first OR gate 281 will be low, and the first retriggerable monoshot 250 will no longer be in the reset state.

Because the RESET input of the second retriggerable monoshot 260 is controlled by an ORing of the inverted EN input 205 signal and the Q output of the first retriggerable monoshot 250, the second retriggerable monoshot 260 may operate in a manner completely analogous to that of the first retriggerable monoshot 250.

When the EN input 205 signal is asserted high, a triggering of the first retriggerable monoshot 250, setting its Q output to 1, will force the output of the second OR gate 282 high and will thus put the second retriggerable monoshot 260 in its reset state. In an analogous manner, a triggering of the second retriggerable monoshot 260 will put the first retriggerable monoshot 250 in its reset state.

In an initial state of operating the interface circuit 200, the EN input may be held low. The low EN input will have the following effects: First, the 0 input to each of the third and fourth AND gates 273, 274 will switch each of the third and fourth SPDT switches 230, 240 to the NC-COM connection. The inverted EN input will cause the first and second OR gates 281, 282 to output 1 and thus hold the first and second retriggerable monoshots 250, 260 in reset. In the reset state, Q output of each of the retriggerable monoshots 250, 260 will be 0 and thus force the outputs of the first and second AND gates 271, 272 to 0, thus switching each of the first and second SPDT switches 210, 220 to the NC-COM connection.

When the master UART first transmits data through the interface circuit 200 to a connected slave UART (i.e., connected via the first and second slave terminals 203, 204), the master UART holds the EN signal low. In this configuration, the data transmitted from the master UART through the master TX input 201 will be routed to the first slave terminal 203 via the first and third SPDT switches 210, 230 and to the second slave terminal 204 via the second and fourth SPDT switches 220, 240. Because initially the interface circuit 200 does not know whether the slave UART receive terminal is connected with the first or second slave terminal 203, 204, data transmitted from the master UART are routed to both slave terminals 203, 204.

When the master UART holds its EN signal low, each of the first and second retriggerable monoshots 250, 260 is held in the reset state and will not be triggered by at the CLK input. Therefore, data from the master UART sent to the first and second slave terminals will not inadvertently trigger these retriggerable monoshots 250, 260.

After the master UART has transmitted its initial data, the master UART then may set the EN input high. This high EN signal ANDed with the nQ output of the first and second retriggerable monoshots 250, 260 that have not yet been triggered will switch each of the third and fourth SPDT switches 230, 240 to the NO-COM connection. This action disconnects the two slave terminals 203, 204 from the two master terminals 201, 202. However, the first slave terminal 203 remains connected with the CLK input of the first retriggerable monoshot 250, and the second slave terminal 204 remains connected with the second retriggerable monoshot 260.

Because the RESET input of each of the two retriggerable monoshots 250, 260 is controlled by an ORing of the inverted EN signal and the Q output of the other retriggerable monoshot 250, 260, and because neither of the two retriggerable monoshots 250, 260 is yet triggered and the Q output of each is 0, the RESET signal to each of the retriggerable monoshots 250, 260 is no longer asserted. Therefore, each of the retriggerable monoshots 250, 260 is waiting for a falling edge transition on its CLK input. Such a falling edge may be provided by a start bit of serial data from a slave UART, for example.

Serial data sent from a slave UART to the first slave input 203 may trigger the first retriggerable monoshot 250 causing its Q output to go high and its nQ output to go low. The high Q output of the first retriggerable monoshot 250 ANDed with the high nQ output of the as-yet-untriggered second retriggerable monoshot 260 switches the first SPDT switch 210 to the NO-COM connection. The low nQ output of the first retriggerable monoshot 250 resets the output of the third AND gate 273 and thus switches the third SPDT switch 230 back to the NC-COM connection. This switching of the first SPDT switch 210 and the third SPDT switch 230 connects the first slave terminal 203 with the master RX output 202 thus routing data from the slave UART transmit date line to the master UART receive data line.

The low nQ output of the first retriggerable monoshot 250 also resets the output of the fourth AND gate 274 and thus switches the fourth SPDT switch 240 back to the NC-COM connection. Because the second retriggerable monoshot 260 has been held in reset by the triggering of the first retriggerable monoshot 250, the Q output of the second retriggerable monoshot 260 remains at 0, forcing a low output of the second AND gate 272. The second AND gate 272 therefore keeps the second SPDT switch 220 in the NC-COM connection. Data are thus routed from the master TX input terminal through the second SPDT switch 220 and through the fourth SPDT switch 240 to the second slave terminal 204, thus routing data from the master UART transmit date line to the slave UART receive data line.

However, if the slave UART transmit data line is instead connected to the second slave terminal 204 (and not to the first slave terminal 203 as in the example above), the interface circuit 200 will configure itself to route data from the second slave terminal 204 to the RX output 202 and to route data from the master TX input to the first slave terminal 203. This alternate configuring of the interface circuit 200 is done via the triggering of the second retriggerable monoshot 260 by data receive from the slave UART via the second slave terminal 204.

The holding of the other retriggerable monoshot 250, 260 (i.e., the retriggerable monoshot 250, 260 that was not triggered by slave UART data) in the reset state prevents that other retriggerable monoshot 250, 260 from being triggered by subsequent data sent by the mater UART. For example, if the interface circuit 200 has been configured to route master transmit data from the master TX input 201 to the second slave terminal 204, the second retriggerable monoshot 260 will not be triggered by that master transmit data because that second retriggerable monoshot 260 is held in reset.

The method of operating the interface circuit 200 has hitherto been described with the master UART transmitting first. When the master UART transmits first, it holds low the EN signal so that the master UART transmit data do not trigger either retriggerable monoshot 250, 260. However, the interface circuit may also be used when a slave UART transmits data first. In this case, the master UART sets the EN signal high as it awaits the first data from the slave UART. But otherwise the interface circuit 200 operates in the same manner whether the master UART transmits first or the slave UART transmits first: the EN signal is asserted high by the master UART as the master UART waits for slave UART data. The receipt of the slave UART data while EN is asserted is the trigger to correctly configure the interface circuit 200.

Since the retriggerable monoshot 250, 260 that was triggered (and only one will be triggered by the slave UART data; the other will be held in reset) will stay in the triggered state for only the pre-determined time period, the triggered retriggerable monoshot 250, 260 needs continual retriggering (i.e., from slave UART data) to stay in the triggered state. In the absence of slave UART data, the triggered retriggerable monoshot 250, 260 may then revert to its untriggered state where Q=0 and nQ=1. When the triggered retriggerable monoshot 250, 260 reverts to Q=0 and nQ=1, the first SPDT switch 210 and the second SPDT switch 220 are then each put in the NC-COM connection; the third SPDT switch 230 and the fourth SPDT switch 240 are then each put in the NO-COM connection. That is, the absence of slave UART data for the pre-determined time period puts the interface circuit 200 back into its unconfigured state awaiting for slave UART data.

When the interface circuit 200 reverts to its unconfigured state, there are two options for again configuring the interface circuit 200. If the master UART must next transmit data to the slave UART, the master UART must set its EN signal low while transmitting the data to the slave UART. However, if the master UART need only wait for the next slave UART data, the master UART may leave its EN signal asserted high, and the next data received from the slave UART will correctly configure the transmit and receive data paths through the interface circuit 200.

This timing-out of the retriggerable monoshots 250, 260 allows different peripherals—perhaps with different transmit and receive connections—to be connected to the master UART without concern for whether a new cable or connection is needed. The interface circuit 200 is able to reconfigure itself with each different peripheral.

Figure 3:
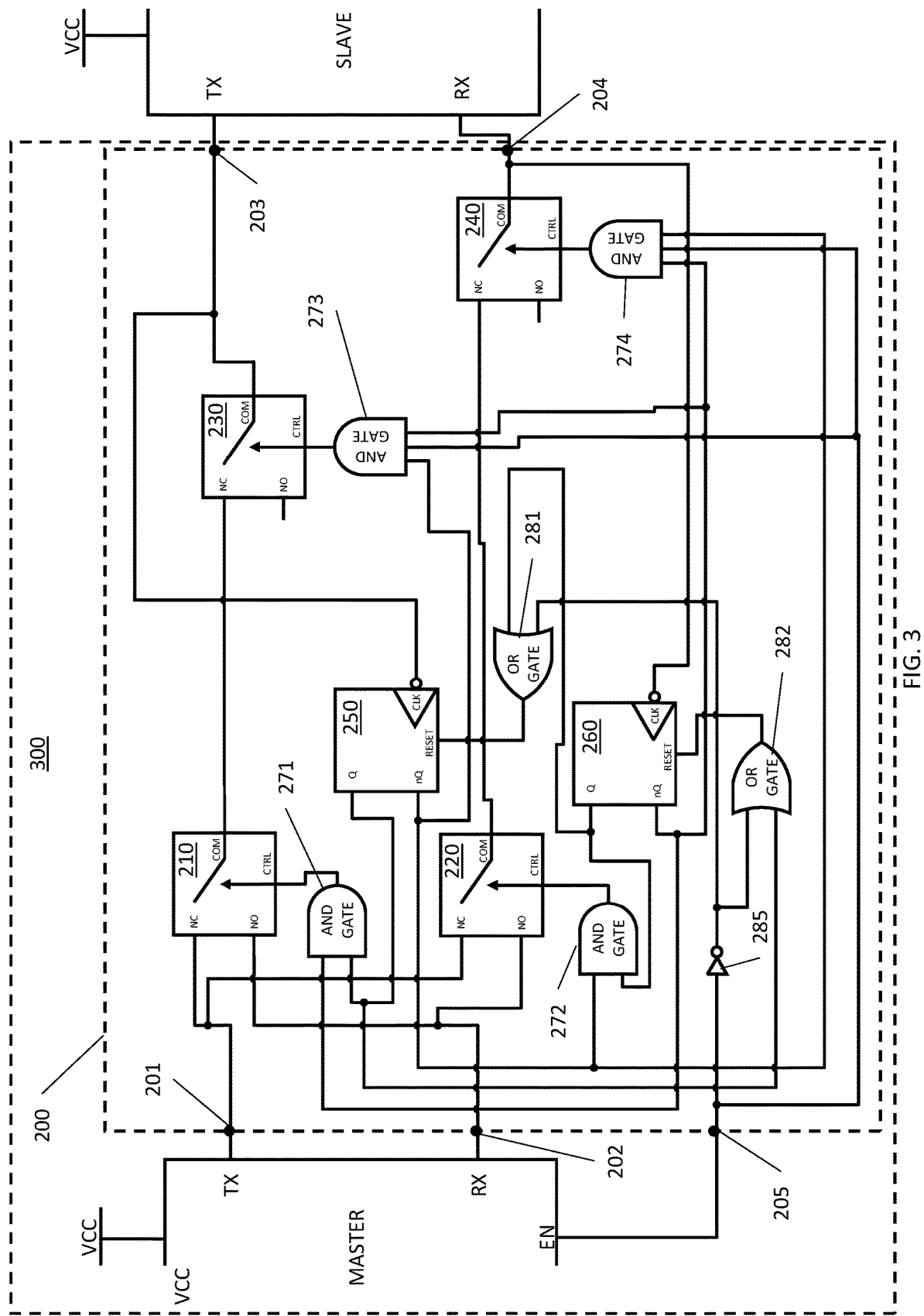
FIG. 3 shows schematically a master UART having a self-configuring UART interface according to an embodiment of the present disclosure.

FIG. 3 shows a master UART 300 having a self-configuring interface circuit according to an embodiment of the present disclosure. The master UART therefore incorporates completely the interface circuit 200 so that the interface circuit is therefore invisible and not known to any slave UART connected with the master UART.

Figure 4:
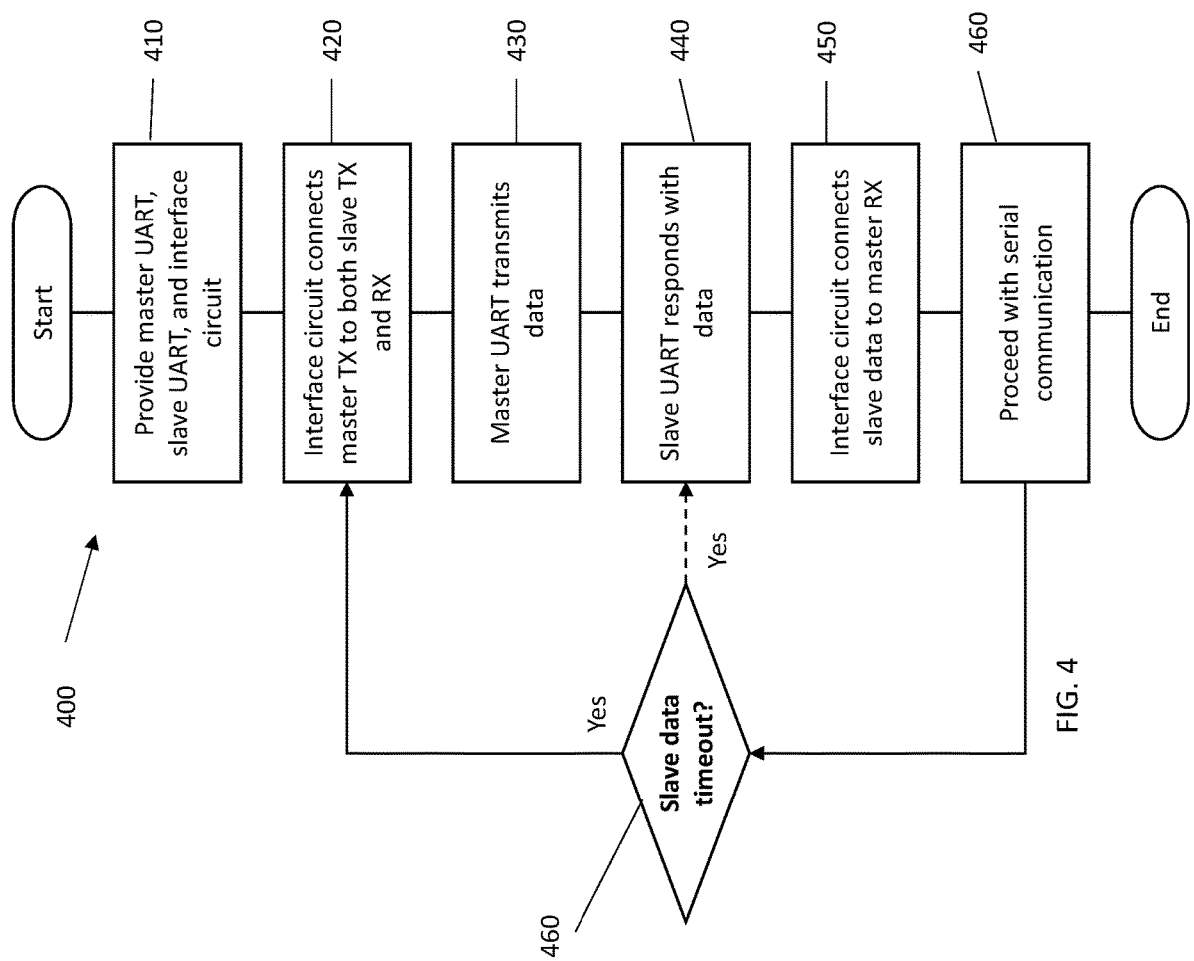
FIG. 4 shows a method of operating a UART interface circuit according to an embodiment of the present disclosure.

FIG. 4 shows a method 400 of operating a UART interface circuit according to an embodiment of the present disclosure.

In a first step 410 of the disclosed method 400, a first device having a master UART, a second device having a slave UART, and an interface circuit may all be provided. The master UART and the slave UART may each include a transmit data line and a receive data line. The interface circuit may include a master TX (transmit) terminal, a master RX (receive) terminal, a first slave terminal, and a second slave terminal.

The master UART's transmit data line may be connected with the TX terminal of the interface circuit. The master UART's receive data line may be connected with the RX terminal of the interface circuit. The slave UART's transmit data line may be connected with either the first or second slave terminal of the interface circuit. The slave UART's receive data line may be connected with the other slave terminal of the interface circuit.

In a step 420 of the disclosed method 400, the interface circuit may internally connect its master TX terminal with both the first slave terminal and the second slave terminal. In this initial configuration of the interface circuit, data sent by the master UART to the TX terminal may be routed to both slave terminals of the interface circuit.

In a step 430 of the disclosed method 400, the master UART may transmit binary data to the slave UART via the TX terminal of the interface circuit. Because the interface circuit is a self-configuring interface circuit, the master UART may first disable the self-configuring of the interface circuit during this first binary data transmission.

In step 430 the binary data may be sent via the interface circuit to both of its slave terminals, and since the slave UART's receive data line is connected with one of these two slave terminals, the slave UART may receive the binary data sent by the master UART.

In a step 440 of the disclosed method 400, the slave UART may respond with binary data to the master UART. The slave UART's transmit data line is connected with one of the two slave terminals (i.e., the slave terminal to which the slave UART's receive data line is not connected). The reception of the slave's data by the interface circuit may indicate to the interface circuit on which of its two slave terminals the slave UART's transmit data line is connected.

In a step 450 of the disclosed method 400, the interface circuit may internally connect the slave terminal on which the slave UART's data were received with the master RX terminal thereby connecting the salve UART's transmit data line with the master UART's receive data line. At the same time, the interface circuit may disconnect from that same slave terminal the master TX terminal. The connection of the master TX terminal to the slave's other terminal, which is the slave UART's receive data line, may be left in place.

In a step 460 of the disclosed method, the master and slave UARTs may proceed with their digital, serial communication.

If, during the digital, serial communication of step 460 no data from the slave UART has been received for a time-out period, the method may return to the step 420 of reconfiguring the interface circuit so that the transmit data line from the master UART is connected with both slave terminals of the interface circuit. Alternately, if the master UART need not transmit data to the slave UART before receiving data from the slave UART, the method may return to step 440 (instead of step 420) to allow the interface circuit to wait for slave UART data so that the interface circuit may again reconfigure itself in step 450. This alternate step is show with a dashed line in FIG. 4.

What is claimed:

1. A universal asynchronous receiver transmitter (UART) interface circuit, comprising:
    a master transmit (TX) input, a master receive (RX) output, a first slave input/output (I/O), a second slave I/O, and an enable (EN) input;
    an inverter configured to logically invert a signal at the EN input;
    a first single-pole, double-throw (SPDT) switch having a normally closed (NC) terminal, a normally open (NO) terminal, a common (COM) terminal, and a control (CTRL) input, wherein the NC terminal is connected with the master TX input and the NO terminal is connected with the master RX output;
    a second SPDT switch having an NC terminal, an NO terminal, a COM terminal, and a CTRL input, wherein the NC terminal is connected with the master TX input and the NO terminal is connected with the master RX output;
    a third SPDT switch having an NC terminal, an NO terminal, a COM terminal, and a CTRL input, wherein the NC terminal is connected with the COM terminal of the first SPDT switch, the COM terminal is connected with the first slave terminal, and the NO terminal is left unconnected;
    a fourth SPDT switch having an NC terminal, an NO terminal, a COM terminal, and a CTRL input, wherein the NC terminal is connected with the COM terminal of the second SPDT switch, the COM terminal is connected with the second slave terminal, and the NO terminal is left unconnected;
    a first retriggerable monoshot having a Q output, an nQ output that is a logical inverse of the Q output, a clock (CLK) input, and a reset input, wherein the CLK input is connected with the first slave terminal, and wherein the Q output remains a logic 1 for a hold time after a triggering of the first retriggerable monoshot;
    a second retriggerable monoshot having a Q output, an nQ output, a CLK input, and a reset input, wherein the CLK input is connected with the second slave terminal, and wherein the Q output remains a logic 1 for the hold time after a triggering of the second retriggerable monoshot;
    a first AND gate configured to logically AND the Q output of the first retriggerable monoshot and the nQ output of the second retriggerable monoshot, wherein an output of the first AND gate drives the CTRL input of the first SPDT switch;
    a second AND gate configured to logically AND the Q output of the second retriggerable monoshot and the nQ output of the first retriggerable monoshot, wherein an output of the second AND gate drives the CTRL input of the second SPDT switch;
    a first OR gate configured to logically OR the inverted EN input and the Q output of the second retriggerable monoshot, wherein an output of the first OR gate drives the reset input of the first retriggerable monoshot;
    a second OR gate configured to logically OR the inverted EN input and the Q output of the first retriggerable monoshot, wherein an output of the second OR gate drives the reset input of the second retriggerable monoshot;

a third AND gate configured to logically AND the nQ output of the first retriggerable monoshot, the nQ output of the second retriggerable monoshot, and the EN input, wherein an output of the third AND gate drives the CTRL input of the third SPDT switch; and a fourth AND gate configured to logically AND the nQ output of the first retriggerable monoshot, the nQ output of the second retriggerable monoshot, and the EN input, wherein an output of the fourth AND gate drives the CTRL input of the fourth SPDT switch.

2. A master universal asynchronous receiver transmitter (UART), comprising:
 a transmit data line configured to output digital data serially;
 a receive data line configured to receive digital data serially;
 a UART interface circuit, including:
  a master transmit (TX) input, a master receive (RX) output, a first slave input/output (I/O), a second slave I/O, and an enable (EN) input;
  an inverter configured to logically invert a signal at the EN input;
  a first single-pole, double-throw (SPDT) switch having a normally closed (NC) terminal, a normally open (NO) terminal, a common (COM) terminal, and a control (CTRL) input, wherein the NC terminal is connected with the master TX input and the NO terminal is connected with the master RX output;
  a second SPDT switch having an NC terminal, an NO terminal, a COM terminal, and a CTRL input, wherein the NC terminal is connected with the master TX input and the NO terminal is connected with the master RX output;
  a third SPDT switch having an NC terminal, an NO terminal, a COM terminal, and a CTRL input, wherein the NC terminal is connected with the COM terminal of the first SPDT switch, the COM terminal is connected with the first slave terminal, and the NO terminal is left unconnected;
  a fourth SPDT switch having an NC terminal, an NO terminal, a COM terminal, and a CTRL input, wherein the NC terminal is connected with the COM terminal of the second SPDT switch, the COM terminal is connected with the second slave terminal, and the NO terminal is left unconnected;
  a first retriggerable monoshot having a Q output, an nQ output that is a logical inverse of the Q output, a clock (CLK) input, and a reset input, wherein the CLK input is connected with the first slave terminal, and wherein the Q output remains a logic 1 for a hold time after a triggering of the first retriggerable monoshot;
  a second retriggerable monoshot having a Q output, an nQ output, a CLK input, and a reset input, wherein the CLK input is connected with the second slave terminal, and wherein the Q output remains a logic 1 for the hold time after a triggering of the second retriggerable monoshot;
  a first AND gate configured to logically AND the Q output of the first retriggerable monoshot and the nQ output of the second retriggerable monoshot, wherein an output of the first AND gate drives the CTRL input of the first SPDT switch;
  a second AND gate configured to logically AND the Q output of the second retriggerable monoshot and the nQ output of the first retriggerable monoshot, wherein an output of the second AND gate drives the CTRL input of the second SPDT switch;
  a first OR gate configured to logically OR the inverted EN input and the Q output of the second retriggerable monoshot, wherein an output of the first OR gate drives the reset input of the first retriggerable monoshot;
  a second OR gate configured to logically OR the inverted EN input and the Q output of the first retriggerable monoshot, wherein an output of the second OR gate drives the reset input of the second retriggerable monoshot;
  a third AND gate configured to logically AND the nQ output of the first retriggerable monoshot, the nQ output of the second retriggerable monoshot, and the EN input, wherein an output of the third AND gate drives the CTRL input of the third SPDT switch; and
  a fourth AND gate configured to logically AND the nQ output of the first retriggerable monoshot, the nQ output of the second retriggerable monoshot, and the EN input, wherein an output of the fourth AND gate drives the CTRL input of the fourth SPDT switch,
 wherein the transmit data line is connected with the master TX input and the receive data line is connected with the master RX output.

3. A master communication interface, comprising:
 a master universal asynchronous receiver transmitter (UART), including:
  a transmit data line configured to output digital data serially;
  a receive data line configured to receive digital data serially;
  a UART interface circuit, including:
   a master transmit (TX) input, a master receive (RX) output, a first slave input/output (I/O), a second slave I/O, and an enable (EN) input;
   an inverter configured to logically invert a signal at the EN input;
   a first single-pole, double-throw (SPDT) switch having a normally closed (NC) terminal, a normally open (NO) terminal, a common (COM) terminal, and a control (CTRL) input, wherein the NC terminal is connected with the master TX input and the NO terminal is connected with the master RX output;
   a second SPDT switch having an NC terminal, an NO terminal, a COM terminal, and a CTRL input, wherein the NC terminal is connected with the master TX input and the NO terminal is connected with the master RX output;
   a third SPDT switch having an NC terminal, an NO terminal, a COM terminal, and a CTRL input, wherein the NC terminal is connected with the COM terminal of the first SPDT switch, the COM terminal is connected with the first slave terminal, and the NO terminal is left unconnected;
   a fourth SPDT switch having an NC terminal, an NO terminal, a COM terminal, and a CTRL input, wherein the NC terminal is connected with the COM terminal of the second SPDT switch, the COM terminal is connected with the second slave terminal, and the NO terminal is left unconnected;
   a first retriggerable monoshot having a Q output, an nQ output that is a logical inverse of the Q output, a clock (CLK) input, and a reset input, wherein the CLK input is connected with the first slave terminal, and wherein the Q output remains a logic 1 for a hold time after a triggering of the first retriggerable monoshot;

a second retriggerable monoshot having a Q output, an nQ output, a CLK input, and a reset input, wherein the CLK input is connected with the second slave terminal, and wherein the Q output remains a logic 1 for the hold time after a triggering of the second retriggerable monoshot;

a first AND gate configured to logically AND the Q output of the first retriggerable monoshot and the nQ output of the second retriggerable monoshot, wherein an output of the first AND gate drives the CTRL input of the first SPDT switch;

a second AND gate configured to logically AND the Q output of the second retriggerable monoshot and the nQ output of the first retriggerable monoshot, wherein an output of the second AND gate drives the CTRL input of the second SPDT switch;

a first OR gate configured to logically OR the inverted EN input and the Q output of the second retriggerable monoshot, wherein an output of the first OR gate drives the reset input of the first retriggerable monoshot;

a second OR gate configured to logically OR the inverted EN input and the Q output of the first retriggerable monoshot, wherein an output of the second OR gate drives the reset input of the second retriggerable monoshot;

a third AND gate configured to logically AND the nQ output of the first retriggerable monoshot, the nQ output of the second retriggerable monoshot, and the EN input, wherein an output of the third AND gate drives the CTRL input of the third SPDT switch; and a fourth AND gate configured to logically AND the nQ output of the first retriggerable monoshot, the nQ output of the second retriggerable monoshot, and the EN input, wherein an output of the fourth AND gate drives the CTRL input of the fourth SPDT switch, wherein the transmit data line is connected with the master TX input and the receive data line is connected with the master RX output; and an enable signal that is a binary output signal, wherein the enable signal is connected with the EN input of the UART interface circuit, wherein the master communication interface is configured to:

send and receive binary serial data via the master UART, set the enable signal low and send binary serial during a first communication via the master UART, set the enable signal high after the first communication via the master UART, and set the enable signal low and send binary serial data during a subsequent communication via the master UART when the master UART has not received binary serial data for at least the hold time.

4. A method of interfacing a master universal asynchronous receiver transmitter (UART) with a slave UART, the method comprising:

providing a UART interface circuit having a master transmit port, a master receive port, a first slave port, and a second slave port, wherein the UART interface circuit is internally configured such that the master transmit port is connected with both the first and second slave ports and such that the master receive port is not connected with either of the slave ports;

connecting a master UART transmit data line with the master transmit port and a master UART receive data line with the master receive port;

connecting a slave UART transmit data line with either of the two slave ports, and connecting a slave UART receive data line with the other slave port;

transmitting binary data from the slave UART transmit data line to the UART interface circuit via the connected port;

configuring the UART interface circuit to internally connect the master receive port with the slave port via which the slave UART transmitted the binary data; and configuring the UART interface circuit to internally connect the master transmit port with the slave port with which the slave UART receive data line is connected.

5. The method of claim 4, further comprising:

before the transmitting of the binary data from the slave UART transmit data line, configuring the UART interface circuit to internally connect the master transmit port with both of the slave ports; and transmitting binary data from the master UART transmit data line to both of the slave ports.

* * * * *